T. F. Christmar,
Elevator.

N° 20,623.  Patented June 22, 1858.

2 Sheets. Sheet 1.

T. F. Christman,
Elevator.

No. 20,623.    Patented June 22, 1858.

UNITED STATES PATENT OFFICE.

THOMAS F. CHRISTMAN, OF WILSON, NORTH CAROLINA.

IMPROVEMENT IN MACHINES FOR RAISING MARL, DIRT, &c.

Specification forming part of Letters Patent No. 20,623, dated June 22, 1858.

*To all whom it may concern:*

Be it known that I, THOMAS F. CHRISTMAN, of Wilson, in the county of Wilson and State of North Carolina, have invented a new and useful Machine for Raising Marl and Dirt, called a "Marl and Dirt Elevator;" and I do hereby declare that the following is a full, clear, and exact description of the same, reference being had to the annexed drawings, making part of this specification, in which—

Figure 1:
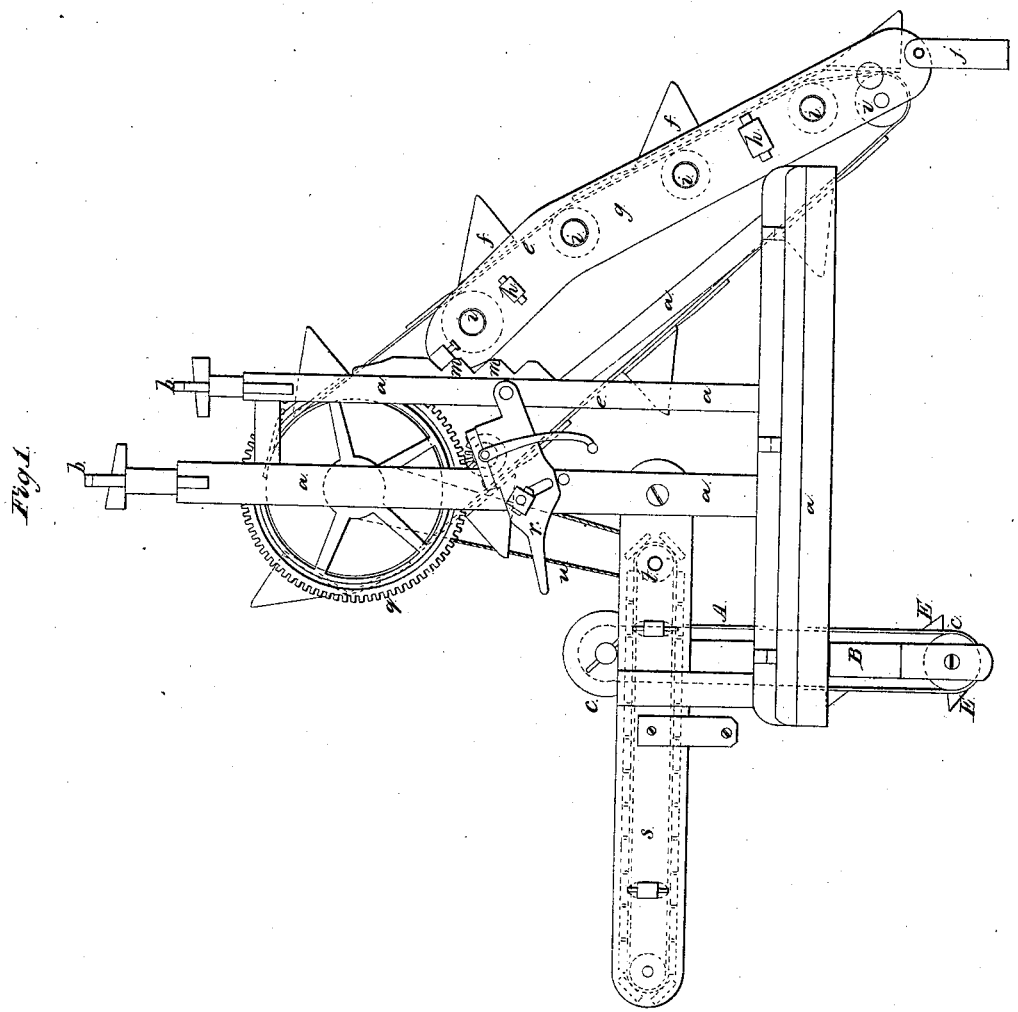
Figure 3:
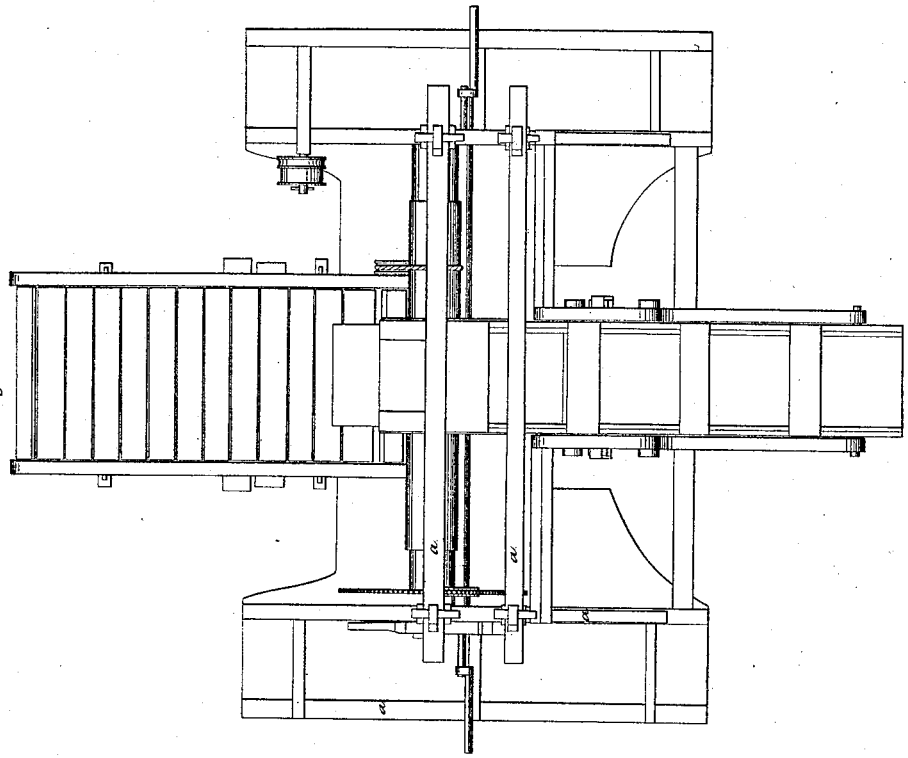
Figure 2:
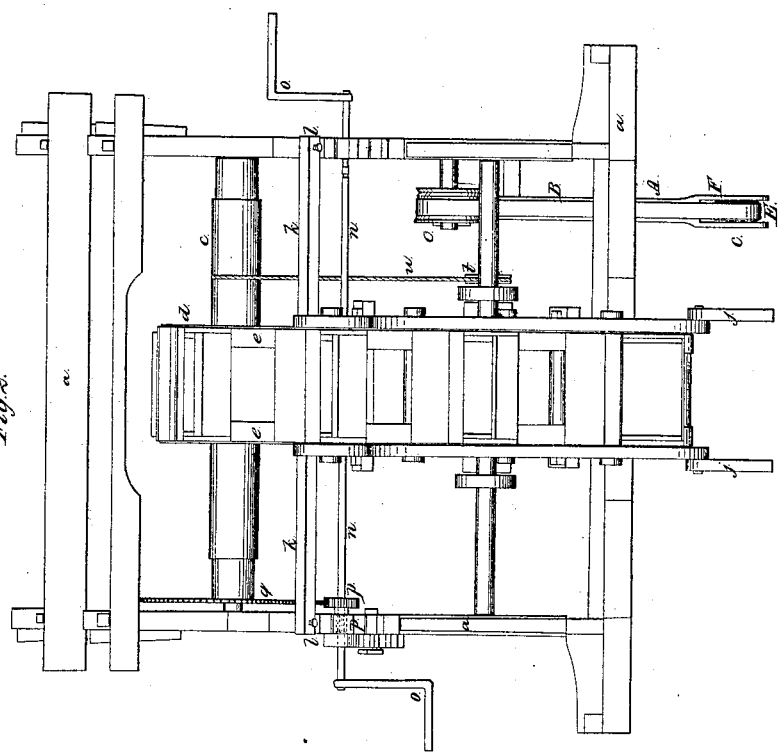

Figure 1 is a side elevation, Fig. 2 a front view, and Fig. 3 a plan.

The nature of my invention consists in providing suitable buckets to lift the marl or dirt from excavations, and also the water that accumulates in the bottom of the same, and an apron to receive and elevate the marl or dirt to the top of the pit, which is worked by cranks and wheels, to effect a great saving of time and labor.

To enable others skilled in the art to make and use my invention, I will proceed to describe its construction and operation.

I construct a movable frame work (see $a\ a\ a\ a\ a$, Figs. 1, 2, and 3) in the form of a double gallows $b\ b$, Fig. 1, between the uprights, and crossing them is a shaft $c$, Fig. 2, upon which is a drum $d$, Fig. 2, around which a belt $e\ e$, Fig. 2, and $e\ e$, Fig. 1, in dotted lines, runs, to which are attached buckets $f\ f$, Fig. 1. The buckets revolve downward into the excavation by means of conductors $g$, Fig. 1, extending down and connected together by bars $h\ h$, Fig. 1. Pinned and fastened on the outside between are rollers $i\ i\ i\ i$, Fig. 1. The lower one the belt passes around, and the upper ones serves to support the belt when loaded and keep it in its place. This is called the "elevator." At the lower end are supports $j\ j\ j$, Figs. 1 and 2, to prevent the buckets from touching the bottom of the pit.

At the upper end of the elevator is a cross-bar $k\ k$, Fig. 2, with screws $l\ l$, Fig. 2, at each end. The bar is placed in notches $m\ m$, Fig. 1, cut in the post, and as the elevator is lowered in the pit will regulate the belt, as may be required.

To operate the machine, a shaft $n\ n$, Fig. 2, crosses the frame, to each end of which is a crank $o\ o$, Fig. 2, and handle, to be operated either by hand, horse, or other power, at one end of the shaft-pinions $p\ p$, Fig. 2, to move the large cog-wheel $q\ q$, Figs. 1 and 2, attached to the shaft $c$. These can be altered so as to run the buckets faster when removing the water from the pit, which may run in at night or when the machine is not working, and are regulated by a lever $r$, Fig. 1, to raise or lower the shaft $n$, as the pinions of different caliber are used. When the marl or dirt is elevated, the buckets turn over and deposit on an endless apron $s$, Fig. 1, which carries it to the bank or cart for removal, and can be lengthened or elevated at pleasure. A pulley $t\ t$, Figs. 1 and 2, is attached to the shaft $c$ by a belt $u\ u$, Figs. 1 and 2, fastened to the endless apron for carrying forward the marl or dirt.

There is an additional elevator at A A, Figs. 1 and 2, for the purpose of raising the water that usually runs into the pit while the operation of digging is going on. For this purpose there is a belt B B, Figs. 1 and 2, running around pulley C C C C, Figs. 1 and 2, operated by a belt running around shaft $c$ and pulley C. A small hole is dug in the pit and in which the buckets E E E, Figs. 1 and 2, may run and reach it by means of a sliding piece arranged at F to extend and reach the bottom of the cavity.

What I claim as my invention, and desire to secure by Letters Patent, is—

The adjustable marl, dirt, and water elevator, in combination with the movable pinions, cross-bar, and endless apron, as described, and with the additional elevator and extension-piece, for the purpose set forth and substantially described in the manner specified.

THOMAS F. CHRISTMAN.

Witnesses:
 THOMS. BIRCH,
 I. D. ROUNTREE.